J. B. HAYDEN,

Assignor, by mesne assignments, to the UNIVERSAL BEER KEG COMPANY.

LAGER BEER KEG.

No. 10,061. Reissued Mar. 14, 1882.

WITNESSES:

Harry Luydam

Chas. H. Hallock

INVENTOR

Joel B. Hayden

BY Hubert A. Banning

ATTORNEY

UNITED STATES PATENT OFFICE.

JOEL B. HAYDEN, OF HEMPSTEAD, ASSIGNOR, BY MESNE ASSIGNMENTS, TO THE UNIVERSAL BEER KEG COMPANY, OF NEW YORK, N. Y.

LAGER-BEER KEG.

SPECIFICATION forming part of Reissued Letters Patent No. 10,061, dated March 14, 1882.

Original No. 234,473, dated November 16, 1880. Application for reissue filed January 13, 1882.

*To all whom it may concern:*

Be it known that I, JOEL B. HAYDEN, of Hempstead, county of Queens, State of New York, have invented a new and useful Improvement in Making Kegs for Lager-Beer and other Liquids, of which the following is a specification, reference being had to the accompanying drawings.

Figure 1:
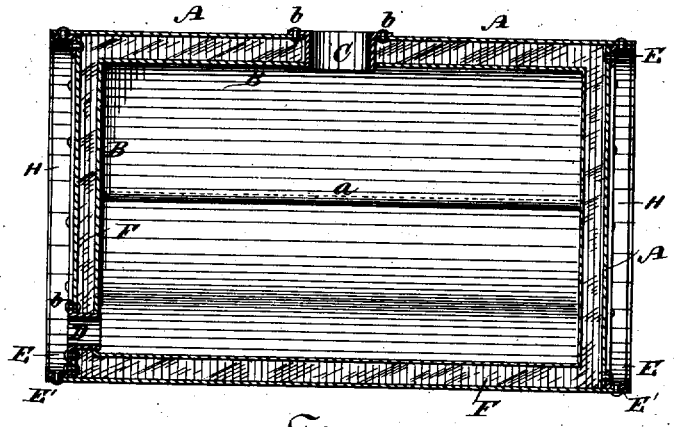
Figure 2:
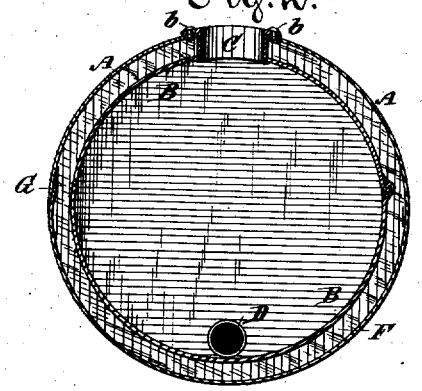

In the drawings, Figure 1 represents a sectional view of the keg through the center from end to end. Fig. 2 represents a sectional view of the keg through the center crosswise.

My invention relates to the making of the keg of metal and a suitable composition in connection therewith, which will be of great durability and do away with the constant expense for cooperage attendant upon the use of wooden kegs.

I make a double keg—the inside one of galvanized iron or other suitable metal, one thirty-second of an inch thick, or thereabout, put together in the usual way of making tin or galvanized-iron packages, and soldered, to make it air-tight, and large enough to hold the requisite quantity of fluid, with apertures for the introduction of suitable bushings for the bung and faucet.

The outside keg is made of sheet-iron, from fourteen to sixteen wire-gage in thickness, and enough larger than the inside one to leave a space of from one-quarter to one-half of an inch all around for the introduction of a composition, hereinafter described, and enough longer than the inside keg to form a chine on each end after the introduction of the head. This outside keg is formed, in the usual way, with lapped joints and riveted with apertures corresponding with the inside keg for the introduction of bushings for the bung and faucet. The heads of the outside keg are made of the same kind of metal to fit closely, and are riveted to an angle-iron, of malleable iron, which projects, say, one inch on the head and has its flange E′ riveted to the cam A to form the chine of the keg, as shown. This angle-iron is made heavy enough to resist blows from handling.

The bushing for the reception of the bung, and through which the keg is filled, and also the bushing through which the faucet is introduced, pass from the outside of the outer keg to the inside of the inner keg, and are securely riveted to hold the two kegs in proper position while the composition is being introduced.

The composition for filling the space between the two kegs consists of flexible strips of wood cut longitudinally with the grain of timber known as "Excelsior" in commerce, and mixed with a compound of glue and plaster-of-paris in sufficient quantity to make it adhesive. It is then pressed into the space between the two kegs with proper appliances, one head being left out until this is accomplished. This head is then pressed in and riveted, as before described. This makes a composition of wonderful strength, the grains of the wood being so interwoven after pressure that it will stand very hard usage without breaking or becoming indented, and is my main dependence in making a strong and light keg.

A represents the outside keg, made of sheet-iron, from fourteen to sixteen wire-gage in thickness, made in proper shape, with joints lapped and riveted, as shown at G. H H represent the heads of the can or keg A; B, the inside keg, made of galvanized iron one thirty-second of an inch thick, or thereabout, and air-tight, in the usual way of making tin or galvanized-iron packages, with matched joints and soldered, as shown at *a*; C, the bushing for the reception of the bung and for filling the keg, extending from the outside of the outer keg to the inside of the inner, being securely fastened by rivets *b*; D, the bushing for the reception of the faucet, extending and fastened like bushing C; E, the angle-irons, riveted to the head, forming right angle, and extending to the end of outer keg, forming a chine, and holding the head securely in place; F, the wood composition, consisting of flexible strips of wood mixed with glue and plaster-of-paris and pressed into the space between the two kegs.

Having thus described my invention, what I claim as new, and desire to secure by Letters Patent, is—

1. A lager-beer keg consisting of the outer metallic can or keg, A, and the inner metallic can or keg, B, connected together by the bushings C and D, and having the space between them filled with flexible strips of wood mixed with a compound of glue and plaster-of-paris in sufficient quantity to make it adhesive, substantially as described.

2. In a metallic lager-beer keg, the heads H H, secured to the angle-irons E E by the rivets *b*, the flange E′ of said angle-irons being riveted to the outer casing to form the chine of the keg, substantially as described.

JOEL B. HAYDEN.

Witnesses:
E. P. JOHNSON,
HUBERT A. BANNING.